US011975753B2

(12) United States Patent
Courtens

(10) Patent No.: US 11,975,753 B2
(45) Date of Patent: May 7, 2024

(54) CONTAINER, METHOD FOR DELIVERING A PLURALITY OF ARTICLES, AND METHOD FOR PICKING UP AT LEAST ONE ARTICLE IMPLEMENTING SUCH CONTAINER

(71) Applicant: Volvo Truck Corporation, Gothenburg (SE)

(72) Inventor: Fabrice Courtens, Caluire (FR)

(73) Assignee: Volvo Truck Corporation, Gothenburg (SE)

( * ) Notice: Subject to any disclaimer, the term of this patent is extended or adjusted under 35 U.S.C. 154(b) by 357 days.

(21) Appl. No.: 17/617,342

(22) PCT Filed: Jul. 19, 2019

(86) PCT No.: PCT/EP2019/069477
§ 371 (c)(1),
(2) Date: Dec. 8, 2021

(87) PCT Pub. No.: WO2021/013316
PCT Pub. Date: Jan. 28, 2021

(65) Prior Publication Data
US 2022/0212707 A1    Jul. 7, 2022

(51) Int. Cl.
*B62B 5/04* (2006.01)
*B62B 3/00* (2006.01)
(Continued)

(52) U.S. Cl.
CPC .............. *B62B 5/049* (2013.01); *B62B 3/004* (2013.01); *B62B 3/02* (2013.01); *B62B 3/04* (2013.01);
(Continued)

(58) Field of Classification Search
CPC ....... B62B 5/049; B62B 5/0013; B62B 3/004; B62B 3/02; B62B 3/04; B62B 2301/044
See application file for complete search history.

(56) References Cited

U.S. PATENT DOCUMENTS 5,997,116 A    12/1999  Schmidt
6,267,393 B1    7/2001  Mengrone et al.
(Continued)

FOREIGN PATENT DOCUMENTS

TW    201406474 A    2/2014
WO    2017196755 A1    11/2017

OTHER PUBLICATIONS

International Search Report and Written Opinion for International Patent Application No. PCT/EP2019/069477, dated Apr. 23, 2020, 11 pages.

*Primary Examiner* — Brian L Swenson
(74) *Attorney, Agent, or Firm* — Withrow & Terranova, PLLC

(57) ABSTRACT

A container comprising a carriage including a superposed base, a rack, and a plurality of compartments, a cabinet defining an inner space configured to accommodate the carriage, and a locking system configured to cooperate with an anchorage provided on the ground surface, the locking system presenting a locked state in which removal of the container from the anchorage is prevented, and an unlocked state, wherein the cabinet is mounted on the rack of the carriage and the rack is movable with respect to the base between retracted and extended positions, a skirt of the cabinet masking at least a major portion of the base of the carriage in the retracted position of the rack, the locking system being in the locked state when the rack is in the retracted position.

22 Claims, 12 Drawing Sheets

(51) Int. Cl.
*B62B 3/02* (2006.01)
*B62B 3/04* (2006.01)
*B62B 5/00* (2006.01)

(52) U.S. Cl.
CPC ...... *B62B 5/0013* (2013.01); *B62B 2301/044* (2013.01)

(56) References Cited

U.S. PATENT DOCUMENTS

| | | | |
|---|---|---|---|
| 7,392,993 B1 * | 7/2008 | Prohl | B62B 3/002 |
| | | | 280/639 |
| 9,643,635 B2 * | 5/2017 | Allen | B62B 3/108 |
| 9,745,130 B1 | 8/2017 | Rawal | |
| 10,597,057 B1 * | 3/2020 | Hilmerson | E04G 5/001 |
| 11,110,947 B2 * | 9/2021 | Finstad | B62B 3/004 |
| 11,426,859 B2 * | 8/2022 | Squiers | A45F 3/047 |
| 11,679,794 B2 * | 6/2023 | Greenblatt | B62B 5/067 |
| | | | 280/33.998 |
| 2005/0035696 A1 | 2/2005 | Parise et al. | |
| 2008/0276840 A1 | 11/2008 | Van Loon et al. | |
| 2014/0132129 A1 | 5/2014 | Deneweth et al. | |
| 2018/0056499 A1 * | 3/2018 | Liu | B25H 1/12 |
| 2019/0104844 A1 | 4/2019 | Garrett | |
| 2022/0281499 A1 * | 9/2022 | Roberts | B62B 3/008 |
| 2023/0062245 A1 * | 3/2023 | Fletcher | B65D 88/12 |

\* cited by examiner

CONTAINER, METHOD FOR DELIVERING A PLURALITY OF ARTICLES, AND METHOD FOR PICKING UP AT LEAST ONE ARTICLE IMPLEMENTING SUCH CONTAINER This application is a 35 USC 371 national phase filing of International Application No. PCT/EP2019/069477, filed Jul. 19, 2019, the disclosure of which is incorporated herein by reference in its entirety.

TECHNICAL FIELD

The invention relates to a container and to a method for delivering a plurality of articles and a method for picking-up at least one article implementing such container.

BACKGROUND ART

The invention especially applies to distribution of articles ordered by users, in particular urban users living in a city. Articles are generally gathered in warehouses outside the city before being delivered by distribution vehicles of different companies to the user individually or through a retail business, such as a supermarket or a store.

Many distribution vehicles of different sizes therefore deliver a same geographical area during restricted hours, which cause congestion in traffic, pollution in the city and which increases costs of article distribution for the users.

As an attempt to address such issues, delivery systems implementing containers with a plurality of compartments each configured to accommodate at least one of the articles are known. In particular, the container is prepared according to the orders of the users and temporary placed on a ground surface where the users may pick-up their article. An example of such delivery system is disclosed in document WO 2017/196755.

However, the containers implemented in such delivery systems are not convenient to handling and transportation and do not offer satisfying safety and modularity.

SUMMARY

The invention aims at solving the above problems.

To that end, according to a first aspect, the invention proposes a container for carrying a plurality of articles, the container comprising:

a carriage including a base and a rack superposed along a carriage axis, the base being configured to rest on a ground surface, the carriage including a plurality of compartments each configured to accommodate at least one of the articles, a cabinet extending along a cabinet axis from a bottom end and defining an inner space provided with a bottom opening along the cabinet axis in the bottom end, the inner space being configured to accommodate the carriage with the carriage axis parallel to the cabinet axis and the base within the bottom opening, the bottom end of the cabinet being configured to form an annular skirt around the cabinet axis, a locking system configured to cooperate with an anchorage provided on the ground surface, the locking system presenting a locked state in which removal of the container from the anchorage is prevented, and an unlocked state in which removal of the container from the anchorage is enabled, wherein the container presents a closed state in which any access to the compartments is prevented, and an opened state in which an access to at least one of the compartments is enabled, wherein the cabinet is mounted on the rack of the carriage and the rack is movable with respect to the base in translation along the carriage axis between a retracted position in which said rack is close to the base and an extended position in which said rack is spaced apart from the base, the skirt masking at least a major portion of the base of the carriage in the retracted position of the rack, the locking system being in the locked state when the rack is in the retracted position.

Hence, in the extended position of the rack of the carriage, the container presents a configuration simplifying handling and transportation while presenting a configuration better suited for delivery of articles, especially in terms of stability and safety versus theft or degradations, in the retracted position of the rack of the carriage.

The carriage may be removable from the cabinet, the container presenting an assembled configuration wherein the carriage is accommodated within the inner space of the cabinet, and a separate configuration wherein the carriage is arranged outside the inner space of the cabinet.

The base of the carriage may be provided with casters configured to roll on the ground surface.

The carriage may be equipped with a braking system presenting an activated state in which the casters are prevented from rolling, and a deactivated state in which the casters are enabled to roll, the braking system being in the activated state when the rack is in the retracted position.

The cabinet may be configured such that the skirt rests on the ground surface when the rack is in the retracted position.

The cabinet may include a cabinet lateral wall extending around the cabinet axis and provided with a front opening in an opening axis perpendicular to the cabinet axis, the front opening being configured to enable an access to the inner space, and wherein each compartment extends along a casing axis parallel to the opening axis, and presents an access opening along the casing axis and facing the front opening of the cabinet, the access opening being configured to enable an access to the compartment, at least one of the front opening and access opening being closed in the closed state of the container.

The front opening may be configured to allow the carriage to pass through said front opening.

The cabinet may further include a front panel configured to cover the front opening in the closed state of the cabinet, and to be spaced apart from the front opening in the opened state of the cabinet.

The front panel may comprise a cabinet door hinged to the cabinet lateral wall.

The cabinet door may extend over an upper portion of a height of the cabinet and the front panel may further comprise a baseboard mounted in a removable manner on the cabinet lateral wall, the baseboard forming a part of the skirt in the closed state of the container.

Each compartment may be delimited by a casing lateral wall extending around the casing axis, and a casing door hinged to the casing lateral wall so as to cover the access opening in the closed state of the container, and to be spaced apart from the access opening in the opened state of the container.

Each compartment may be formed in a casing mounted in a removable manner on the rack of the carriage.

Each casing may be chosen among a range of casings having different sizes, the plurality of compartments resulting from a modular arrangement of casings.

The base may present a contact surface intended to be in contact with the ground surface and the locking system may comprise a locking member mounted on the rack and configured to cooperate with the anchorage, the locking member being arranged at a distance from the contact surface when the rack is in the extended position and at proximity of the contact surface when the rack is in the retracted position.

The locking member may be electromagnetic, the locking system comprising a power source configured to supply the electromagnetic locking member with power in the locked state of the locking system.

The locking system may further comprise a blocking arrangement configured to prevent the rack from being moved towards the extended position while the locking member is in the locked state.

The container may further comprise a central unit connected to the carriage, the cabinet and the locking system and configured to set the rack in one of the retracted and extended positions, the container in one of the opened and closed state and the locking system in one of the locked and unlocked state.

The container may further comprise a communication interface connected to the central unit and configured to enable a user to communicate with the central unit.

According to a second aspect, the invention proposes a method for delivering a plurality of articles implementing the aforementioned container, the method comprising steps of:
  preparing the container, the container being in the opened state, articles being accommodated in the compartments of the carriage,
  setting the container in the closed state,
  placing the container on a ground surface provided with an anchorage,
  moving the container with the rack of the carriage in the extended position, setting the rack of the carriage in the retracted position and the locking system in the locked state,
  enabling at least one user to pick-up at least one of the articles, the container being set in the opened state,
  retrieving the container.

Prior to prepare the container, the articles may be ordered by users. The method may further comprise steps of:
  defining a location of the ground surface based on information related to the users,
  communicating the location and an access code to each user, the access code enabling the cabinet to be set in the opened state.

According to a third aspect, the invention proposes a method for picking-up at least one article implementing the aforementioned container, the container being placed on a location of a ground surface provided with an anchorage, the container being in the closed state, the rack being in the retracted position and the locking system being in the locked state, the method comprising steps of:
  enabling at least one user to deposit at least one article in at least one compartment of the carriage, the container being set in the opened state,
  retrieving the container.

Prior to enabling the user to deposit the article, the article may be requested to be picked-up by the user. The method may further comprise a step of communicating a location of the ground surface and an access code to the user, the access code enabling the container to be set in the opened state.

BRIEF DESCRIPTION OF DRAWINGS

Other objects and advantages of the invention will emerge from the following disclosure of a particular embodiment of the invention given as a non-limitative example, the disclosure being made in reference to the enclosed drawings in which.

DESCRIPTION OF EMBODIMENTS

In the Figures, the same reference numbers refer to the same or similar elements.

Figure 1:
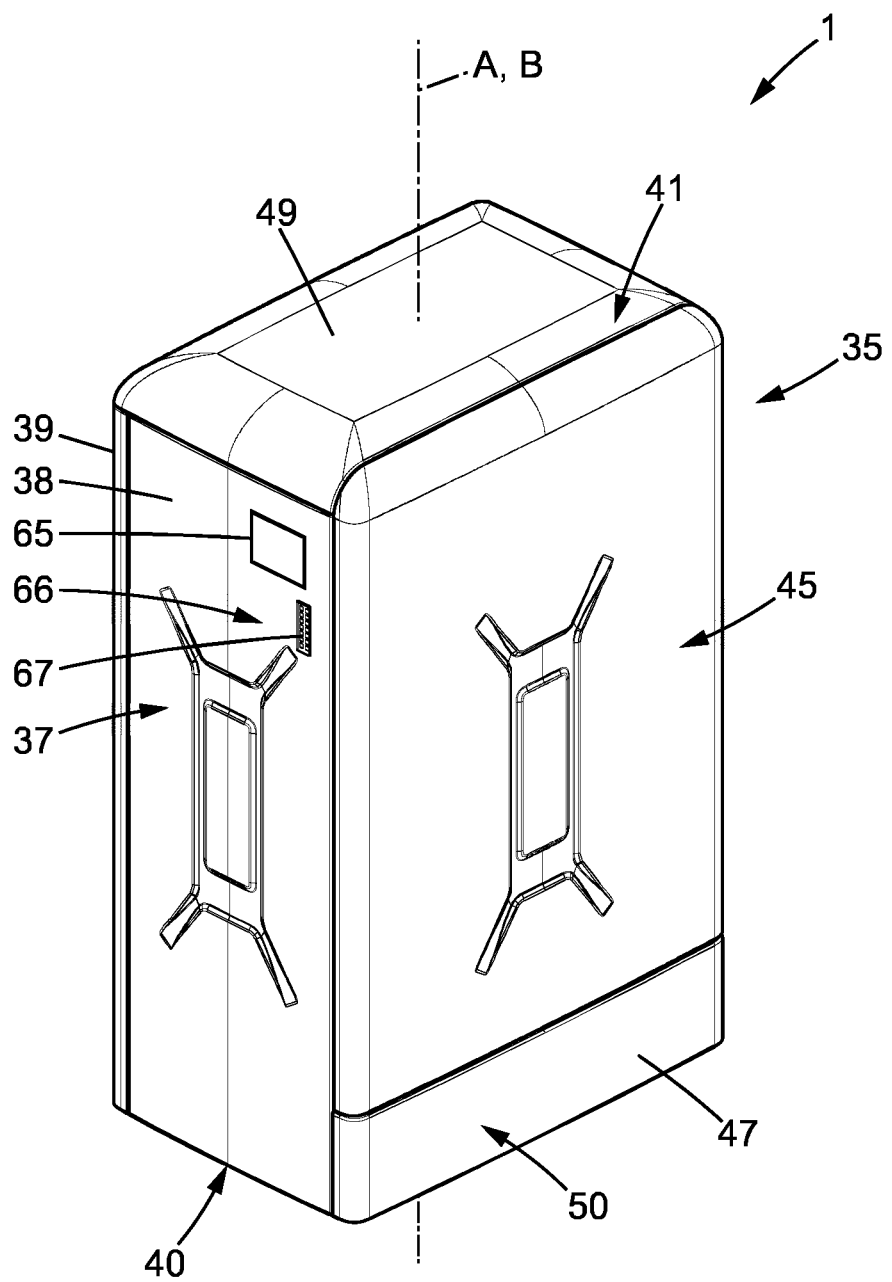
FIGS. 1 and 2 are perspective views of a container for carrying articles according to an embodiment of the invention, the container comprising a carriage including a plurality of compartments each configured to accommodate one or several of the articles, and a cabinet defining an inner space configured to accommodate the carriage, the container presenting a closed state in which any access to the compartments is prevented, and an opened state in which an access to at least one of the compartments is enabled.
Figure 2:
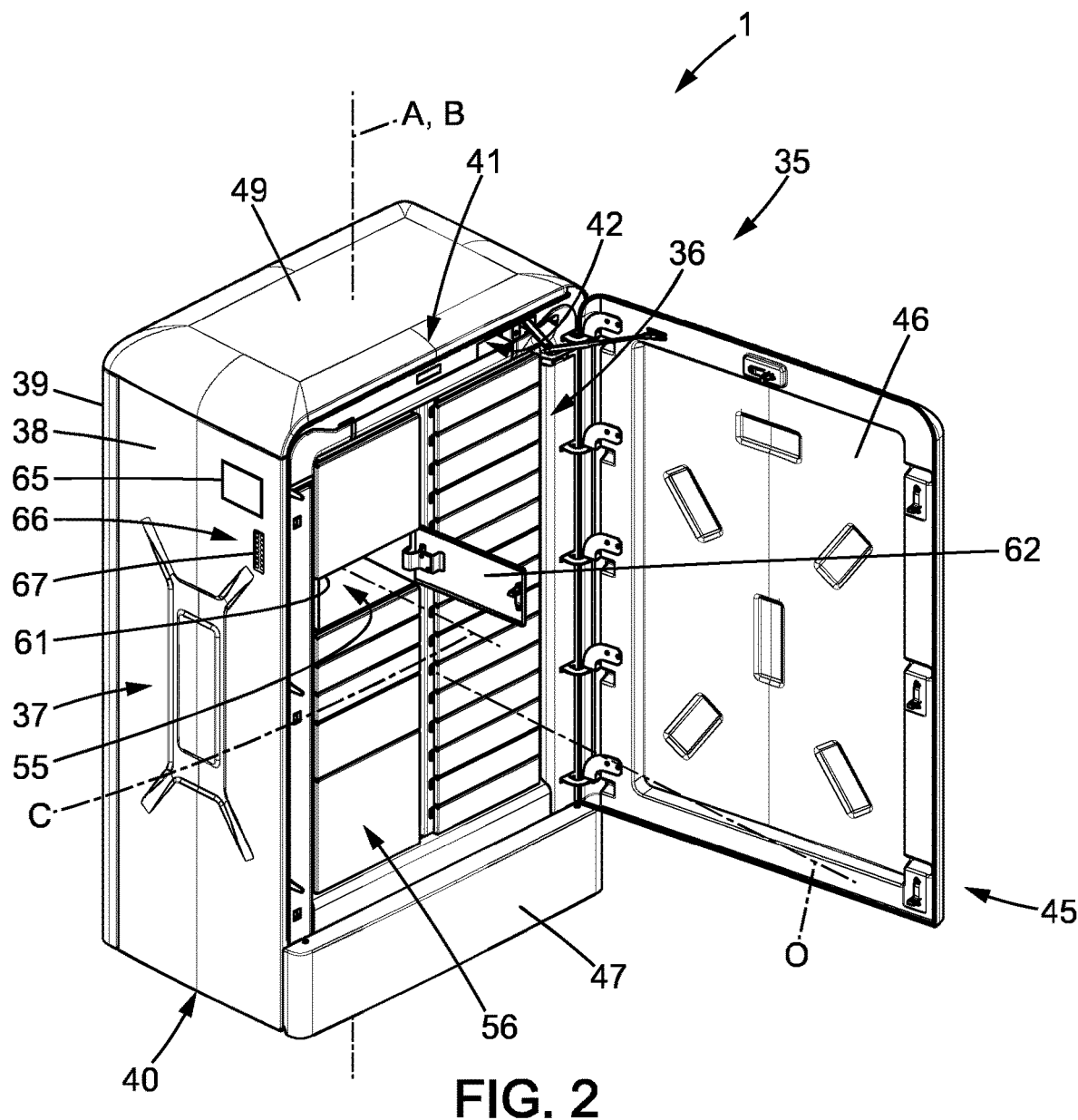

FIGS. 1 and 2 illustrate a container 1 for carrying articles according to an embodiment of the invention. Although not limited thereto, such container 1 finds particular applications for delivering articles ordered by different users 2 of a same geographical area, such as a town or a neighborhood of a city.

The container 1 comprises a carriage 5 including a plurality of compartments 55 each configured to accommodate one or several of the articles, and a cabinet 35 defining an inner space 36 configured to accommodate the carriage 5. The carriage 5 will be disclosed more in details in relation with FIGS. 5 to 8.

In the illustrated embodiment, the cabinet 35 has a global parallelepiped shape along a cabinet axis A. The cabinet 35 includes a cabinet lateral wall 37, cylindrical along the cabinet axis A and of rectangular cross-section, with:
- two lateral panels 38 parallel to each other, along short sides of the rectangular cross-section, and presenting each two longitudinal edges along the cabinet axis A facing the longitudinal edges of the other lateral panel 38, and
- a back panel 39, along one of the long sides of the rectangular cross-section, perpendicular to the lateral panels 38 and connecting two respective longitudinal edges facing each other of the lateral panels 38.

Each of the lateral 38 and back 39 panels presents opposite bottom and upper transverse edges perpendicular to the cabinet axis A and at a distance from each other along the cabinet axis A. The bottom transverse edges of the lateral 38 and back 39 panels define a bottom end 40 of the cabinet 35 and the upper transverse edges of the lateral 38 and back 39 panels define an upper end 41 of the cabinet 35.

The cabinet 35 is configured to enable an access to the inner space 36 perpendicularly to the cabinet axis A. To that end, a front opening 42 is provided in an opening axis O perpendicular to the cabinet axis A. In addition, the cabinet 35 has a front panel 45 configured to removably cover the front opening 42. In particular, the front panel 45 comprises a cabinet door 46 hinged to the longitudinal edge of one of the lateral panel 38 of the cabinet lateral wall 37 along an axis parallel to the cabinet axis A. The cabinet door 46 presents a closed position in which it covers at least a portion of the front opening 42, and an opened position in which it is spaced apart from the front opening 42. In the illustrated embodiment, the cabinet door 46 extends over an upper portion of a height, measured along the cabinet axis A, of the cabinet 35, departing from the upper end 41 of the cabinet 35. The front panel 45 then further comprises a baseboard 47 mounted in a removable manner on the cabinet lateral wall 37 and connected in any suitable manner to the respective longitudinal edges, facing each other, of the lateral panels 38, close to their bottom transverse edges. Alternatively, the cabinet door 46 could extend over the whole height of the cabinet 35, the baseboard 47 being part of the cabinet door 46.

The cabinet 35 includes a top panel 49 extending transversally to the cabinet axis A and connecting the top transverse edges of the lateral 38 and back 39 panels whereas the bottom transverse edges of the lateral 38 and back 39 panels as well as a bottom transverse edge of the baseboard 47 remain free. The cabinet 35 then has a closed top end 41 and an opened bottom end 40, which opened bottom end define a bottom opening 36a along the cabinet axis A for the inner space 36.

As shown in FIG. 1, the container 1 presents a closed state in which the cabinet door 46 in the closed position and the baseboard 47 cover the front opening 42 so that any access to the inner space 36 and hence to the compartments 55 is prevented. In such closed state, the bottom end 40 of the cabinet forms a continuous annular skirt 50 around the cabinet axis A of the cabinet 35, which skirt 50 includes the baseboard 47 and portions of the lateral 38 and back 39 panels close to their bottom transverse edges. As shown in FIG. 2, the container 1 presents an opened state in which at least the cabinet door 46 in the opened position is spaced apart from the front opening 42 so that an access to the inner space 36 and hence to at least one of the compartments 55 is enabled.

Figure 3:
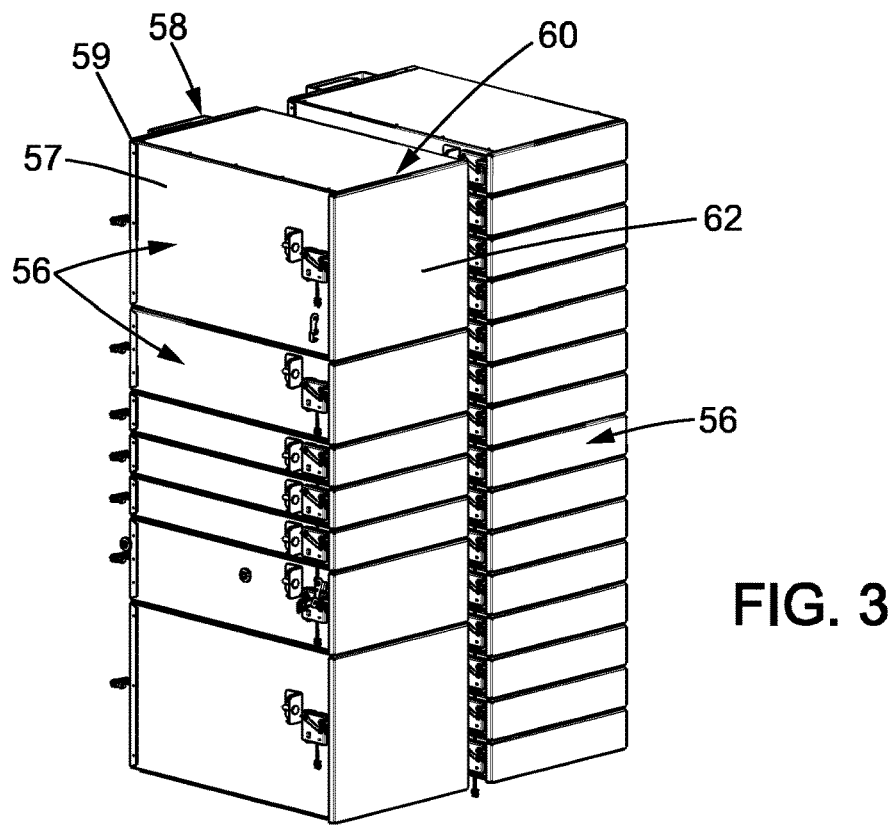
FIGS. 3 and 4 are perspective views of two different arrangements of casings of different sizes intended to be mounted on the carriage of the container of FIGS. 1 and 2, each of the casing including one of the compartments.
Figure 4:
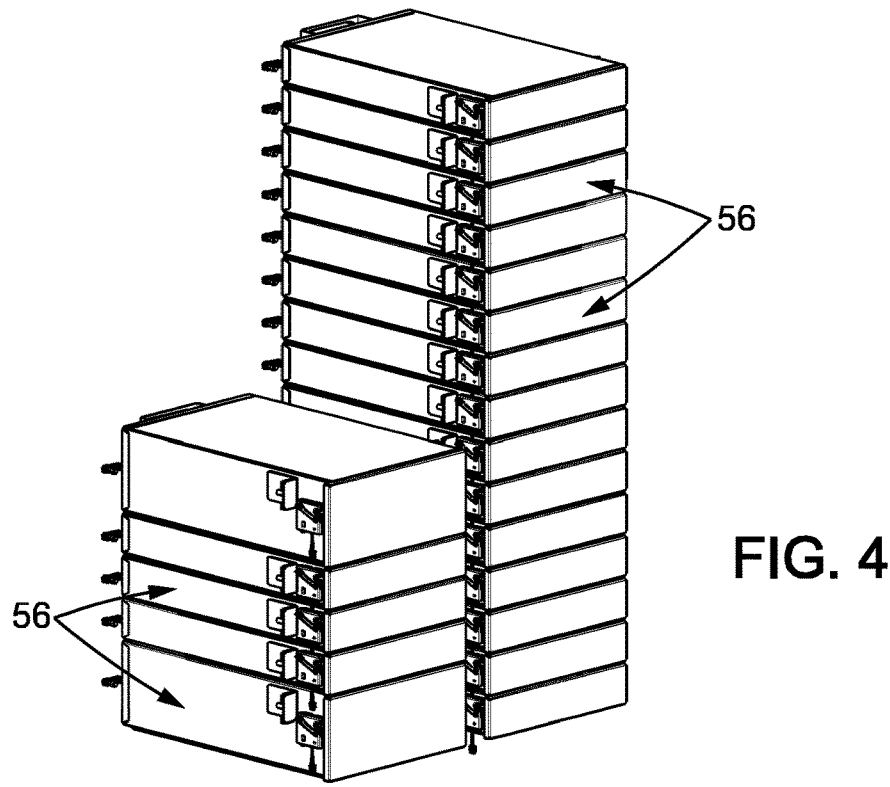

In FIGS. 3 and 4, each compartment 55 is formed in a casing 56 of global parallelepiped shape along a casing axis C and of rectangular cross-section. Each casing 56 includes a casing lateral wall 57 around the casing axis C. The casing lateral wall 57 presents opposite back and front edges annular around the casing axis C. A back end 58 of the casing lateral wall 57 may be closed by a back wall 59 extending transversally to the casing axis C and connected to the back edge of the casing lateral wall 57. The front edge of the casing lateral wall 57 remains free so that a front end 60 of the casing lateral wall 57, opposite the back end 58, define an access opening 61 along the casing axis C. In the illustrated embodiment, a casing door 62 is hinged to the casing lateral wall 57 so as to cover the access opening 61 in a closed position, and to be spaced apart from the access opening 61 in an opened position.

The invention is disclosed in relation with a container 1 having both cabinet door 46 and casing door 62 in their opened position in the opened state of the container 1 and both cabinet door 46 and casing door 62 in their closed position in the closed state of the container 1. The container 1 could however be deprived of cabinet door 46 in which case, in the opened state of the container 1, only the casing door 62 is opened and, in the closed state of the container 1, only the casing door 62 is closed. Alternatively, the container 1 could be deprived of casing door 62 in which case, in the opened state of the container 1, only the cabinet door 46 is opened and, in the closed state of the container 1, only the cabinet door 46 is closed.

As apparent from FIGS. 3 and 4, each casing 56 may be chosen among a range of casings having different sizes to provide a modular arrangement of casings 56. On FIGS. 3 and 4, two different arrangements of casings 56 of different sizes are shown.

As shown on FIG. 2, the arrangement of casings 56 is placed within the inner space 36 of the cabinet 35 so that each compartment 55 opens perpendicularly to the cabinet axis A, the casing axis C being parallel to the opening axis O and the access opening 61 facing the front opening 42 of the cabinet 35.

Advantageously, the arrangement of casings 56 is mounted in a removable manner on the carriage 5 and the carriage 5 is removable from the cabinet 35.

A particular embodiment of the carriage 5 is represented in FIGS. 5 to 8. The carriage 5 includes a base 6 and a rack 12 superposed along a carriage axis B.

The base 6 extends globally transversally to the carriage axis B. In the illustrated embodiment, the base 6 includes an arrangement of rigid bars to form a frame 7 of rectangular shape with two long bars 8 parallel to each other, and two short bars 9 parallel to each other and each connecting two respective ends facing each other of the long bars 8. The base 6 is configured to rest on a ground surface. In particular, the base 6 is provided with casters 10 configured to roll on the ground surface. In the illustrated embodiment, the casters 10 are placed at each corner of the frame 7 and at least two of them may further pivot along an axis parallel to the carriage axis B to enable orientation of the carriage 5 while it is moved on the ground surface.

The rack 12 is mounted on the base 6 and configured to receive the arrangement of casings 56. In particular, the rack 12 includes an arrangement of rigid bars forming a frame 13 of global parallelepiped shape with four main posts 14 extending along the carriage axis B substantially aligned respectively with the corners of the base 6 and a number of main traverses 16 arranged perpendicularly to the carriage axis B and connecting the main posts 14 together to provide sufficient rigidity. In particular, in the figures, four lower main traverses 16 arranged in a rectangular configuration connect two by two lower ends, namely close to the base 6, facing each other of the main posts 14. Two upper main traverses 16, parallel to the long bars 8 of the base 6, each connect two respective upper edges, namely spaced apart from the base 6, facing each other, of two main posts 14. Additional posts 15 and traverses 17 are provided to ensure further rigidity and enable attachment of the arrangement of casings 56 in any suitable manner.

The rack 12 is mounted on the base 6 so as to be movable with respect to the base 6 in translation along the carriage axis B. A driving mechanism 20, including one or several actuators 21, is provided to move the rack 12 between an extended position shown in FIGS. 5 and 6 and a retracted position shown in FIGS. 7 and 8. In the extended position, the rack 12 is arranged at a first distance from the base 6 whereas, in the retracted position, the rack 12 is arranged at a second distance from the base 6, the second distance being smaller than the first distance. Then, in the retracted position, the rack 12 is close to the base 6 and, in the extended position, the rack 12 is further away from the base 6 with respect to the retracted position. In the illustrated embodiment, although not limited thereto, the driving mechanism 20 comprises four actuators 21 in the form of cylinders each arranged between each main post 14 of the rack 12 and the corresponding corner of the base 6.

Figures 5, 6:
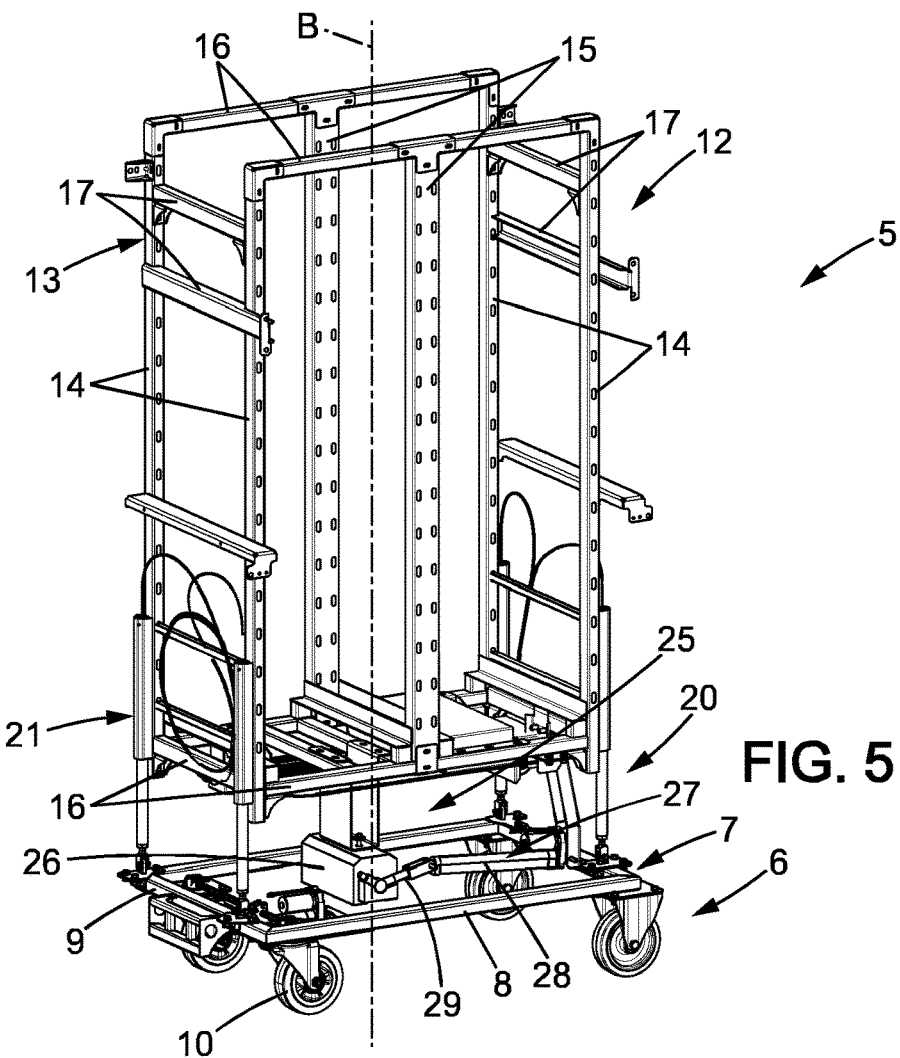
FIG. 5 is a perspective view of the carriage of the container of FIGS. 1 and 2, the carriage including a base and a rack superposed along a carriage axis, the base being provided with casters configured to roll on the ground surface, the cabinet being mounted on the rack of the carriage and the rack being movable with respect to the base in translation along the carriage axis, the rack being in an extended position in which it is spaced apart from the base, the container further presenting a locking system with a locking member mounted on the rack and configured to cooperate with an anchorage provided on the ground surface, the locking system being in an unlocked state in which removal of the container from the anchorage is enabled.
FIG. 6 is an enlarged bottom view of the carriage of FIG. 5.
Figure 7:
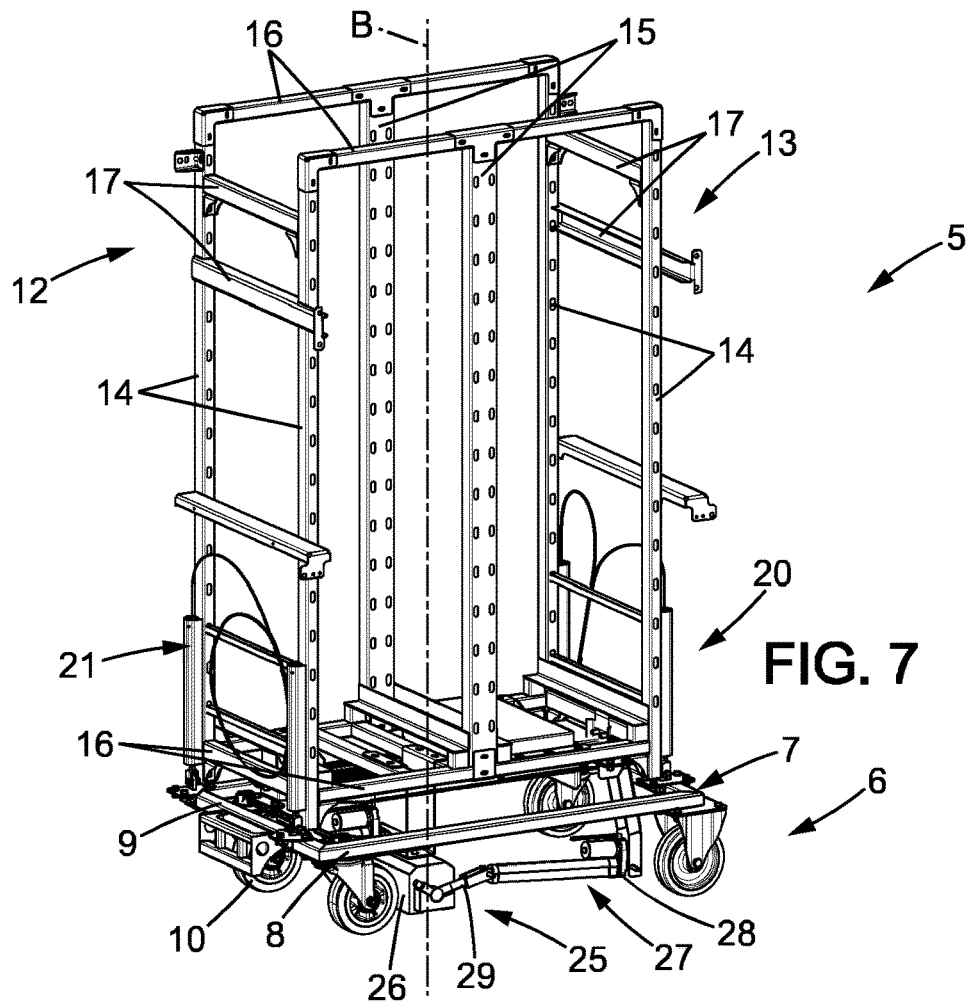
FIG. 7 is a perspective view of the carriage of the container of FIGS. 1 and 2, the rack being in a retracted position in which it is close to the base, the locking system being in a locked state in which removal of the container from the anchorage is prevented.
Figure 8:
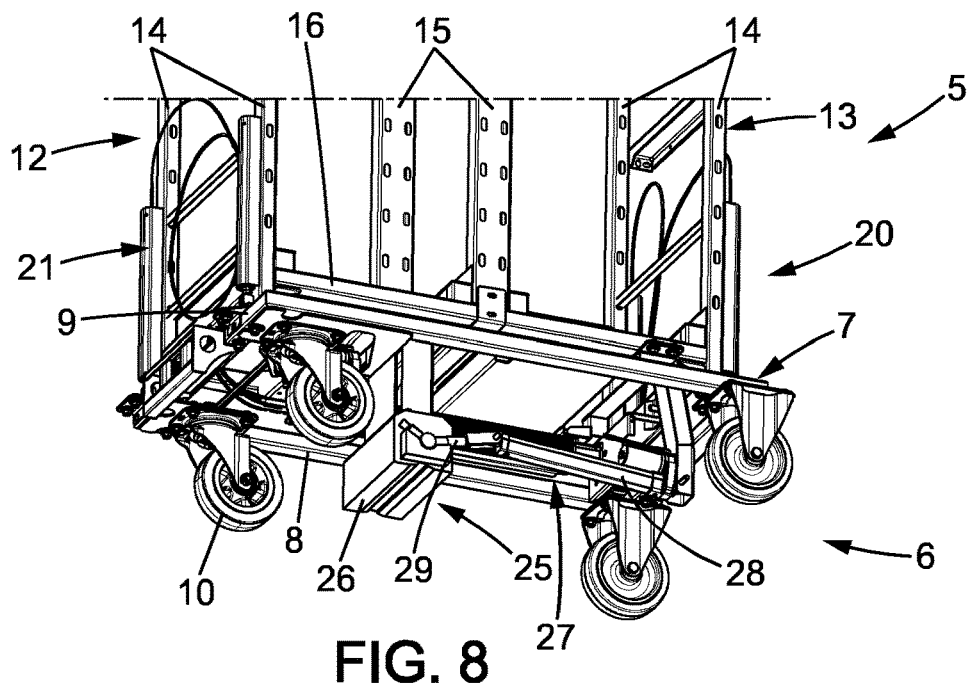
FIG. 8 is an enlarged bottom view of the carriage of FIG. 7.

As better shown in FIGS. 6 and 8, the container 1 further comprises a locking system 25 configured to cooperate with an anchorage 3 provided on the ground surface. In particular, the locking system 25 presents a locked state in which removal of the container 1 from the anchorage 3 is prevented, and an unlocked state in which removal of the container 1 from the anchorage 3 is enabled.

In the illustrated embodiment, the locking system 25 is of electromagnetic type and comprises an electromagnetic locking member 26 and a power source configured to supply the locking member 26 with power in the locked state of the locking system 25. The locking member 26 is mounted on the rack 12 of the carriage 5 and configured to cooperate with the anchorage 3, in the form of magnetic plate 4 fixed to the ground surface. In FIG. 6, the rack 12 is in the extended position and the locking member 26 is arranged at a distance from a contact surface of the base 6 of the carriage 5, defined by contacts of the casters 10 with the ground surface. In FIG. 8, the rack 12 is in the retracted position and the locking member 26 is arranged at proximity of the contact surface.

Alternatively, any other suitable arrangement of the locking member 26 could be provided. Especially, as it will become apparent from the following of the description, the locking member 26 could be mounted on the cabinet 35, especially on the skirt 50 of the cabinet 35. The locking member 26 could also be mounted on the base 6 of the carriage 5. Besides, the locking system 25 could be of any other suitable type, especially mechanic for example with a hook, forming one of the locking member 26 and the anchorage 3, and a ring, forming the other of the locking member 26 and the anchorage 3.

Figure 9:
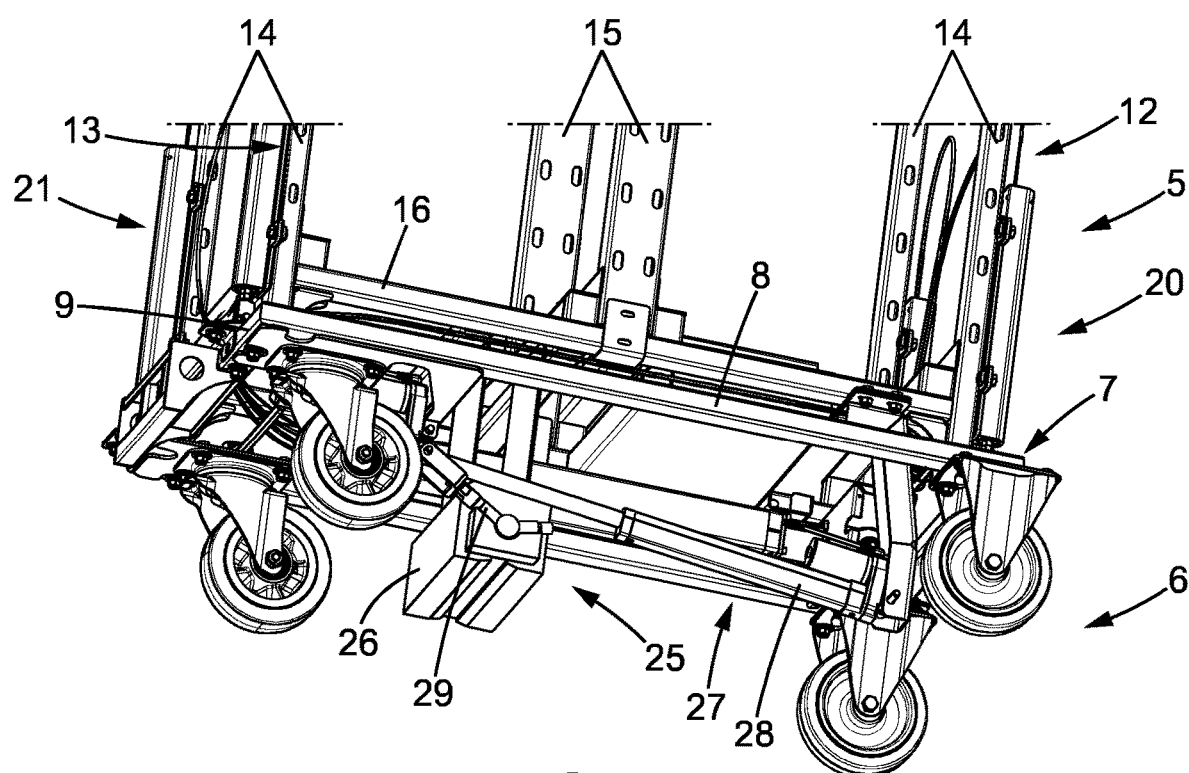
FIG. 9 is a perspective bottom view of the carriage of the container of FIGS. 1 and 2, illustrating a blocking arrangement configured to prevent the rack from being moved towards the extended position while the locking member is in the locked state.
Figure 10:
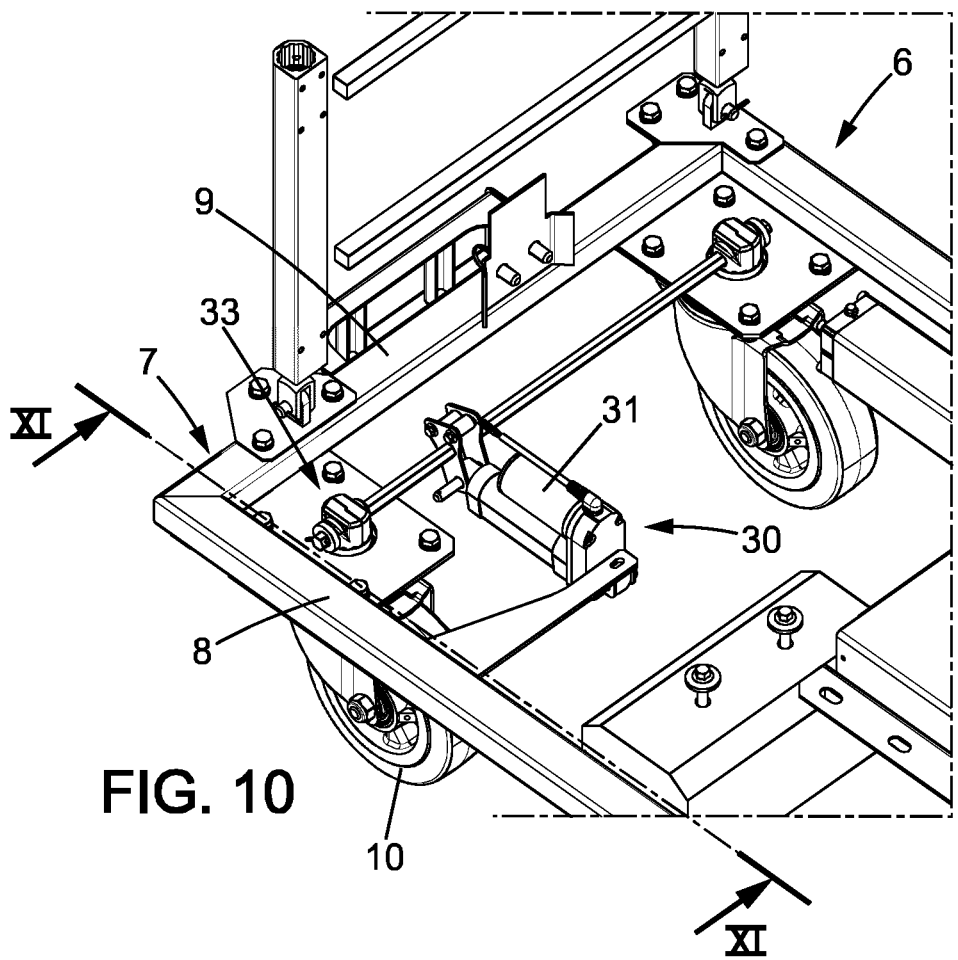
FIGS. 10 and 11 are enlarged perspective view and side view along orientation referenced XI-XI in FIG. 10 of a braking system mounted on the base of the carriage of the container of FIGS. 1 and 2, the braking system being in an activated state in which the casters are prevented from rolling.
Figure 11:
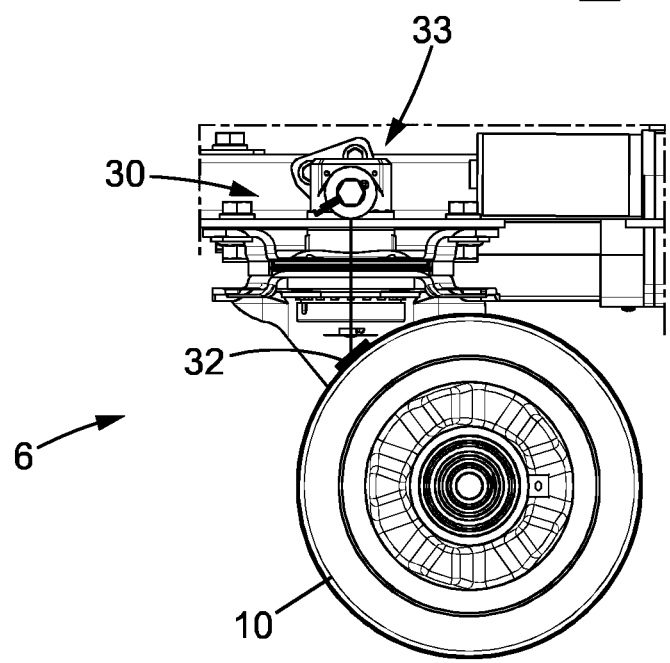

As shown in FIG. 9, the locking system 25 may further comprise a blocking arrangement 27 configured to prevent the rack 12 from being moved towards the extended position while the locking member 26 is in the locked state. In the illustrated embodiment, the blocking arrangement 27 comprises a cylinder 28 connected to the locking member 26 by an arrangement of articulated links 29 configured so that when the cylinder 28 is in an extended state, the links 29 prevent any movement of the locking member 26.

Figure 12:
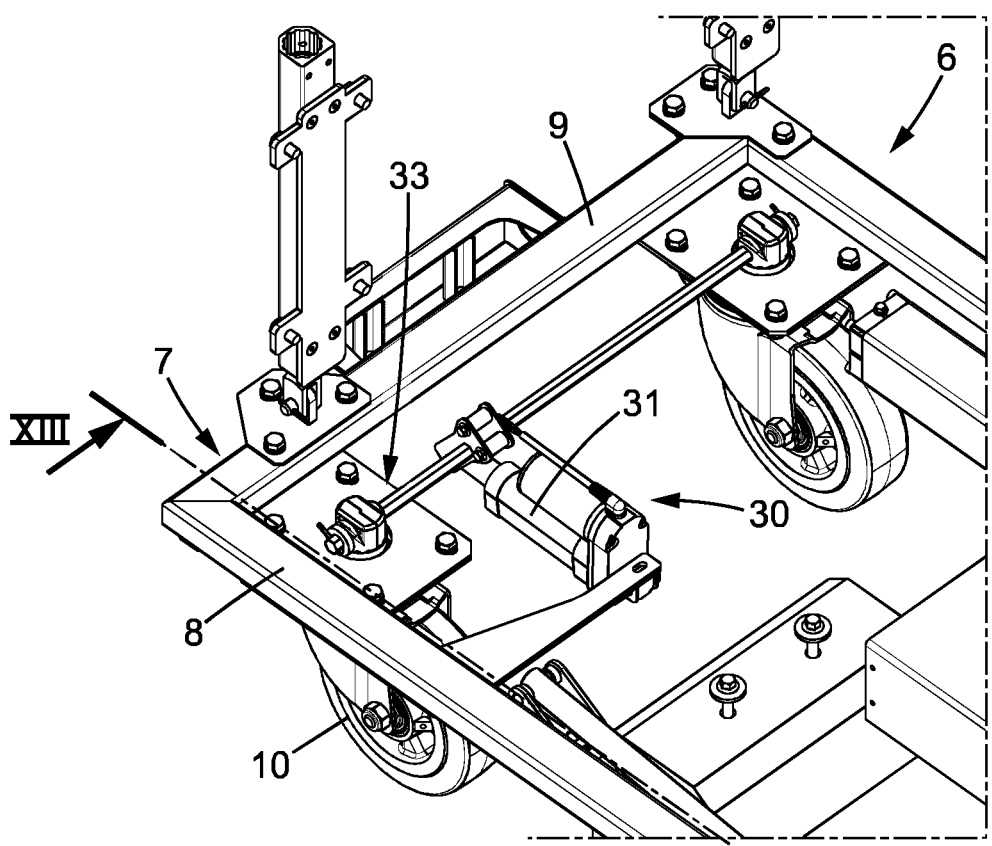
FIGS. 12 and 13 are enlarged perspective view and side view along orientation referenced XIII-XIII in FIG. 10 of the braking system of the container of FIGS. 1 and 2, the braking system being in a deactivated state in which the casters are enabled to roll.
Figure 13:
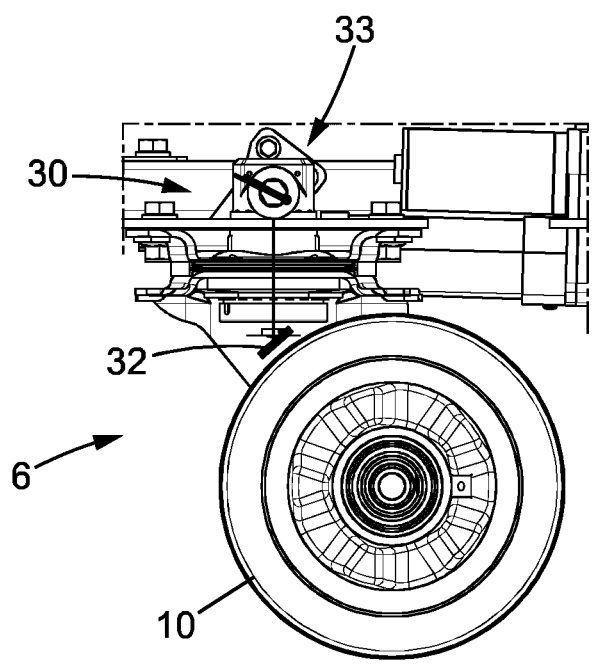
Figure 14:
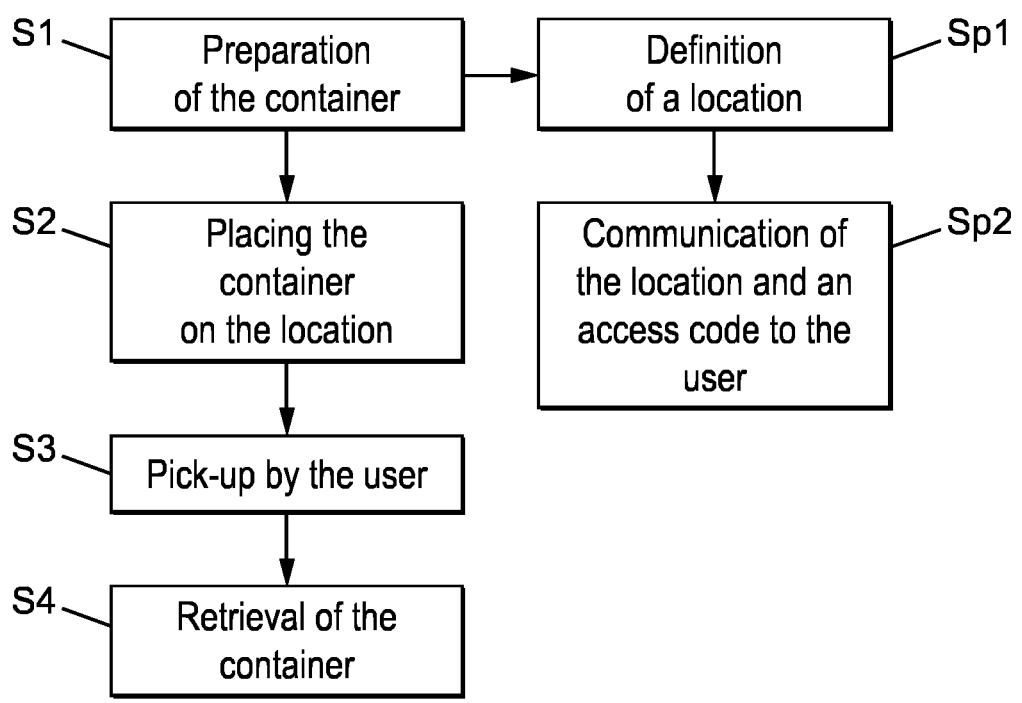
FIG. 14 is a flowchart illustrating a method for delivering a plurality of articles implementing the container of FIGS. 1 and 2, FIGS. 15 to 19 are perspective views of the container of FIGS. 1 and 2 illustrating steps of a method for delivering articles.

As shown in FIGS. 10 to 13, the carriage 5 is equipped with a braking system 30 presenting an activated state in which the casters 10 are prevented from rolling, and a deactivated state in which the casters 10 are enabled to roll. In particular, the braking system 30 comprises an actuator 31, for example a cylinder, connected to one or several pads 32 through a transmission mechanism 33 so that the pads 32 are in contact with the casters 10 in the activated position (FIGS. 10 and 11) and spaced apart from the casters 10 in the deactivated position (FIGS. 12 and 13).

In order to enable accommodation of the carriage 5 within the inner space 36 of the cabinet 35 and subsequent removal of the carriage 5 from the cabinet 35, the front opening 42 of the cabinet 35 is configured to allow the carriage 5 to pass through it. In particular, in the opened state of the container 1, the cabinet door 46 opens wide and the baseboard 47 is removed. The container 1 may then present an assembled configuration wherein the carriage 5 is accommodated within the inner space 36 of the cabinet 35 with the carriage axis B parallel to, especially aligned with, the cabinet axis A and the base 6 within the bottom opening 36a of the inner space 36, and a separate configuration wherein the carriage 5 is arranged outside the inner space 36 of the cabinet 35.

When the carriage 5 is accommodated within the inner space 36 of the cabinet 35, the cabinet 35 is mounted on the rack 12 of the carriage 5. The cabinet 35 can be set at a first level from the contact surface in the extended position of the rack 12 and at a second level from the contact surface in the retracted position of the rack 12, the second level being lower than the first level. The cabinet 35 may then be lowered as the rack 12 is moved from the extended position to the retracted position and elevated as the rack 12 is moved from the retracted position to the extended position. The cabinet 35 is configured so that the skirt 50 masks at least a major portion, namely at least 50%, preferably, at least 75%, especially at least 90%, of the base 6 of the carriage 5, together with the casters 10 and the locking system 25, in the retracted position of the rack 12. More preferably, the cabinet 35 is configured so that the skirt 50 entirely masks the base 6 of the carriage 5, together with the casters 10 and the locking system 25, the bottom end 40 of the cabinet 35 being flush with the contact surface of the base 6 so as to rest on the ground surface in the retracted position of the rack 12.

The container 1 comprises a central unit 65 connected to the carriage 5, and especially the driving mechanism 20, to the cabinet, to the locking system 25 and possibly to the casings 56 to set the rack 12 in one of the retracted and extended positions, the cabinet 35 in one of opened and closed positions, the locking system 25 in one of the locked and unlocked state and the casing doors 62 in one of the opened and closed positions. The container 1 further comprises a communication interface 66 connected to the central unit 65 and configured to enable a user 2 to communicate with the central unit 65. The communication interface 66 may comprise one or several wired communication devices, such as a keypad 67 mounted on an outer surface of the cabinet 35, and/or one or several wireless communication device configured to communicate with a portable device held by the user 2.

In relation with FIGS. 14 and 15 to 19, a method for delivering articles implementing the container 35 is disclosed. As mentioned previously, the articles may be ordered by users 2, for example on websites, and gathered in warehouses outside the city.

At step Sp1, depending on information about the users 2, and especially their address, a location of the ground surface where the container 1 should be placed is defined.

At step Sp2, the location is communicated to each user 2 together with an access code of any suitable kind such as an electromagnetic signal, optic signal, a password or other, enabling the cabinet 35 to be set in the opened state.

Figure 15:
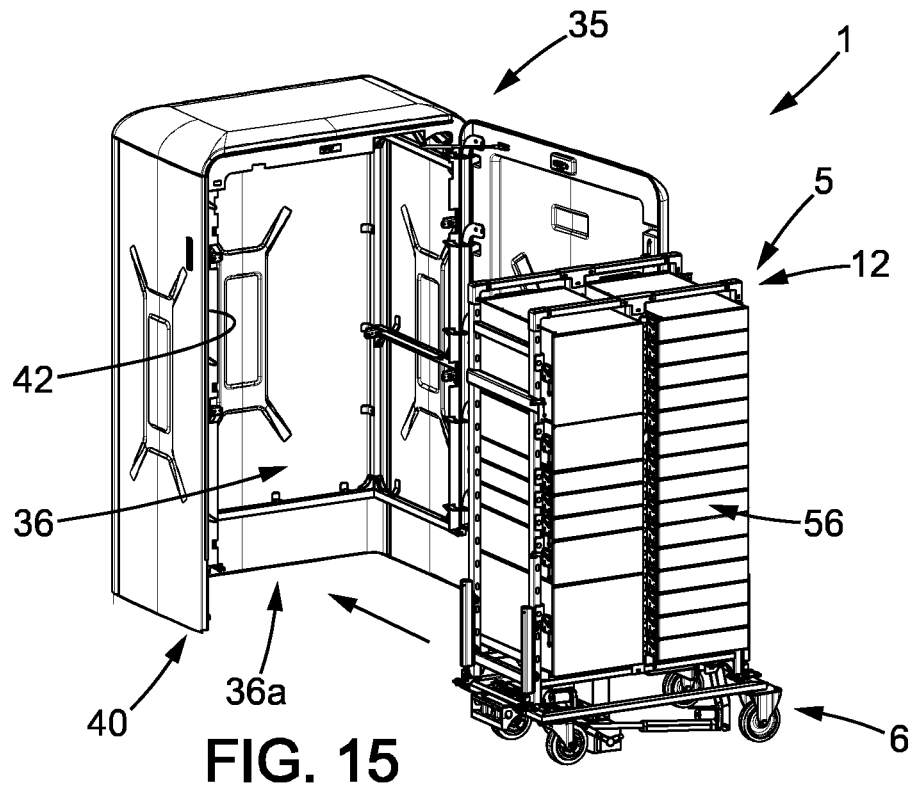
Figure 16:
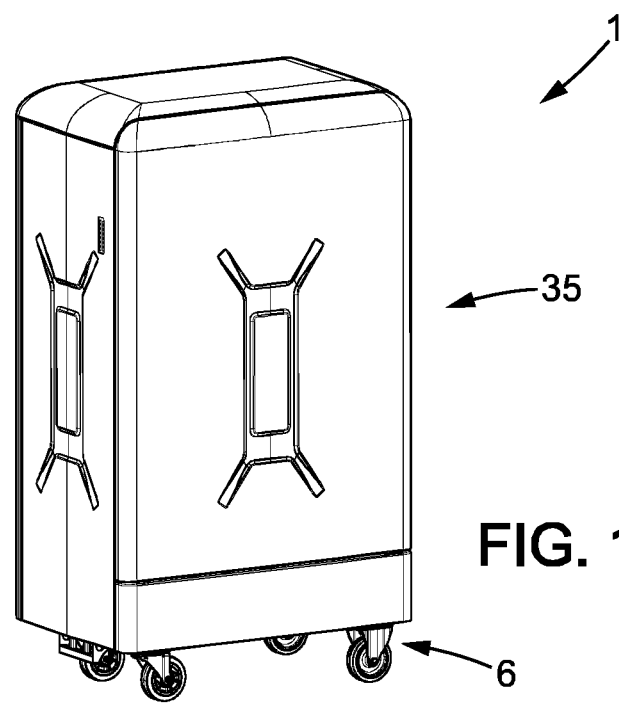

At step S1, the container 1 is prepared. Each casing 56 is chosen based on the size and/or number of articles it is to contain. A suitable arrangement of casings 56 is prepared and mounted on the rack 12 of the carriage 5 in the extended position. In FIG. 15, the container 1 is set in the opened state and the carriage 5 is moved within the inner space 36 of the cabinet 35. The container 1 is then set in the closed state. As shown in FIG. 16, the container 1 is moved, manually or through a trolley 70, with the rack 12 remaining in the extended position.

The container 1 may be transported in a truck with other similar containers 1 prepared in a similar manner but possibly differing by their arrangement of casings 56. During transportation, the rack 12 may be set in the retracted position.

Figure 17:
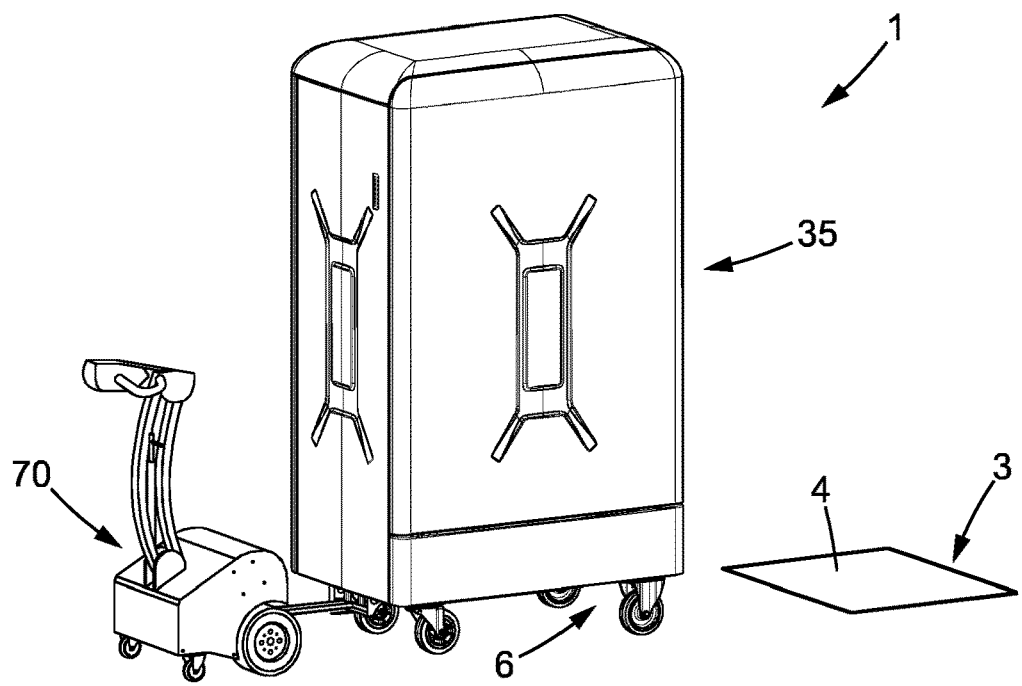
Figure 18:
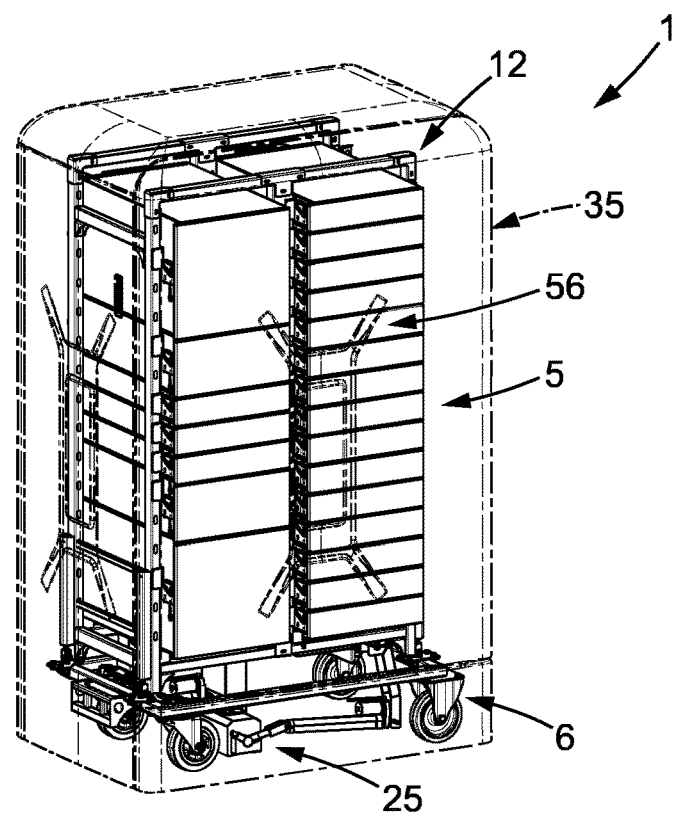

At step S2, as shown in FIG. 17, once arrived at the defined location, the rack 12 is set in the extended position so that the container 1 may be placed on the ground surface provided with the anchorage 3. In FIG. 18, the rack 12 of the carriage 5 is set in the retracted position, the cabinet 35 being lowered so that the skirt 50 rests on the ground surface and masks at least a major portion of the base 6 of the carriage 5.

In this retracted position of the rack 12, the locking member 26 is at the vicinity, especially in contact, with the magnetic plate 4 of the anchorage 3 and power is supplied to the locking member 26 to put the locking system 25 in the locked state. The container 1 is then anchored to the ground surface thanks to attraction forces between the electromagnetic locking member 26 and the magnetic plate 4. The blocking arrangement 27 is activated to prevent the rack 12 from being moved towards the extended position and the braking system 30 is put in the activated state. Removal of the container 1 from the anchorage 3 is thus prevented.

Figure 19:
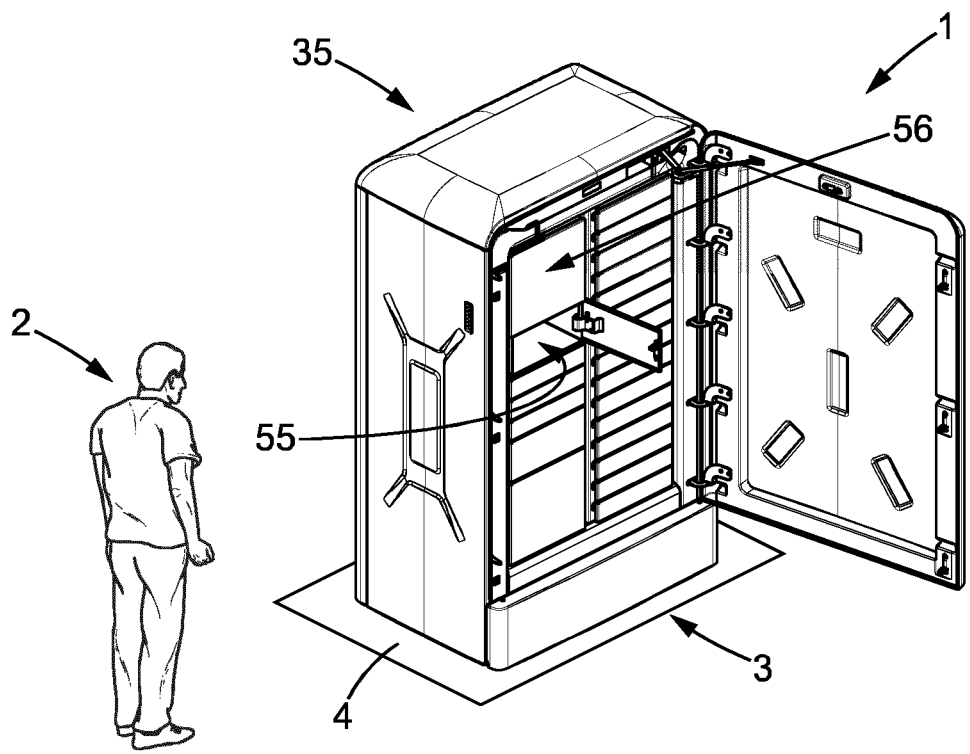

At step S2, as shown in FIG. 19, each user 2 is enabled to pick-up the article or articles he has ordered thanks to his the access code setting the container 1 in the opened state and the casing door 62 in the opened position.

At step S4, once the articles have been picked-up or after a determined time period has lapsed, the container 1 may be retrieved or placed at another location defined in accordance with articles remaining therein.

Figure 20:
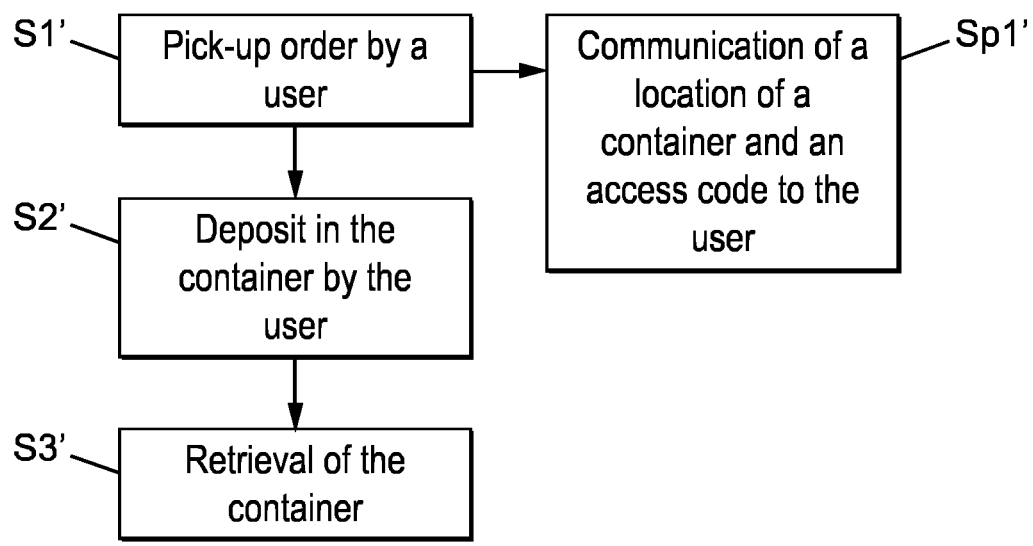
FIG. 20 is a flowchart illustrating a method for picking-up an article implementing the container of FIGS. 1 and 2.

In FIG. 20, the container 1 may also be implemented in a method for picking-up one or several articles.

At step S1', the article is requested to be picked-up by the user 2. At step Sp1', a location of the ground surface on which the container 1 is placed is communicated to the user 2 together with an access code enabling the container 1 to be set in the opened state. At the location, the container 1 is in the closed state, the rack 12 is in the retracted position and the locking system 25 is in the locked state.

At step S2', the user 2 is enabled to deposit the article one of the compartments 55 of the carriage 5 thanks the access code.

At step S3', the container 1 is retrieved.

The invention claimed is:

1. A container for carrying a plurality of articles, the container comprising:
   a carriage including a base and a rack superposed along a carriage axis, the base being configured to rest on a ground surface, the carriage including a plurality of compartments each configured to accommodate at least one of the articles,
   a cabinet extending along a cabinet axis from a bottom end and defining an inner space provided with a bottom opening along the cabinet axis in the bottom end, the inner space being configured to accommodate the carriage with the carriage axis parallel to the cabinet axis and the base within the bottom opening, the bottom end of the cabinet being configured to form an annular skirt around the cabinet axis,
   a locking system configured to cooperate with an anchorage provided on the ground surface, the locking system presenting a locked state in which removal of the container from the anchorage is prevented, and an unlocked state in which removal of the container from the anchorage is enabled,
   wherein the container presents a closed state in which any access to the compartments is prevented, and an opened state in which an access to at least one of the compartments is enabled,
   wherein the cabinet is mounted on the rack of the carriage and the rack is movable with respect to the base in translation along the carriage axis between a retracted position in which the rack is close to the base and an extended position in which the rack is spaced apart from the base, the skirt masking at least a major portion of the base of the carriage in the retracted position of the rack, the locking system being in the locked state when the rack is in the retracted position.

2. The container of claim 1, wherein the carriage is removable from the cabinet, the container presenting an assembled configuration wherein the carriage is accommodated within the inner space of the cabinet, and a separate configuration wherein the carriage is arranged outside the inner space of the cabinet.

3. The container of claim 1, wherein the base of the carriage is provided with casters configured to roll on the ground surface.

4. The container of claim 3, wherein the carriage is equipped with a braking system presenting an activated state in which the casters are prevented from rolling, and a deactivated state in which the casters are enabled to roll, the braking system being in the activated state when the rack is in the retracted position.

5. The container of claim 1, wherein the cabinet is configured such that the skirt rests on the ground surface when the rack is in the retracted position.

6. The container of claim 1, wherein the cabinet includes a cabinet lateral wall extending around the cabinet axis and provided with a front opening in an opening axis perpendicular to the cabinet axis, the front opening being configured to enable an access to the inner space, and
wherein each compartment extends along a casing axis parallel to the opening axis, and presents an access opening along the casing axis and facing the front opening of the cabinet, the access opening being configured to enable an access to the compartment,
at least one of the front opening and the access opening being closed in the closed state of the container.

7. The container of claim 6, wherein the front opening is configured to allow the carriage to pass through the front opening.

8. The container of claim 6, wherein the cabinet further includes a front panel configured to cover the front opening in the closed state of the container, and to be spaced apart from the front opening in the opened state of the container.

9. The container of claim 8, wherein the front panel comprises a cabinet door hinged to the cabinet lateral wall.

10. The container of claim 9, wherein the cabinet door extends over an upper portion of a height of the cabinet and the front panel further comprises a baseboard mounted in a removable manner on the cabinet lateral wall, the baseboard forming a part of the skirt in the closed state of the container.

11. The container of claim 6, wherein each compartment is delimited by a casing lateral wall extending around the casing axis, and a casing door hinged to the casing lateral wall so as to cover the access opening in the closed state of the container, and to be spaced apart from the access opening in the opened state of the container.

12. The container of claim 1, wherein each compartment is formed in a casing mounted in a removable manner on the rack of the carriage.

13. The container of claim 12, wherein each casing is chosen among a range of casings having different sizes, the plurality of compartments resulting from a modular arrangement of casings.

14. The container of claim 1, wherein the base presents a contact surface intended to be in contact with the ground surface and the locking system comprises a locking member mounted on the rack and configured to cooperate with the anchorage, the locking member being arranged at a distance from the contact surface when the rack is in the extended position and at proximity of the contact surface when the rack is in the retracted position.

15. The container of claim 14, wherein the locking member is electromagnetic, the locking system comprising a power source configured to supply the electromagnetic locking member with power in the locked state of the locking system.

16. The container of claim 1, wherein the locking system further comprises a blocking arrangement configured to prevent the rack from being moved towards the extended position while the locking member is in the locked state.

17. The container of claim 1, further comprising a central unit connected to the carriage, the cabinet, and the locking system, and configured to set the rack in one of the retracted and extended positions, the container in one of the opened and closed state and the locking system in one of the locked and unlocked state.

18. The container of claim 17, further comprising a communication interface connected to the central unit and configured to enable a user to communicate with the central unit.

19. A method for delivering a plurality of articles comprising:
preparing a container comprising a carriage, a cabinet, and a locking system, the carriage including a base and a rack superposed along a carriage axis, the base being configured to rest on a ground surface, the carriage including a plurality of compartments each configured to accommodate at least one of the articles, the cabinet extending along a cabinet axis from a bottom end and defining an inner space provided with a bottom opening along the cabinet axis in the bottom end, the inner space being configured to accommodate the carriage with the carriage axis parallel to the cabinet axis and the base within the bottom opening, the bottom end of the cabinet being configured to form an annular skirt around the cabinet axis, the locking system configured to cooperate with an anchorage provided on the ground surface, the locking system presenting a locked state in which removal of the container from the anchorage is prevented, and an unlocked state in which removal of the container from the anchorage is enabled, the container being in an opened state in which an access to at least one of the compartments is enabled, articles being accommodated in the compartments of the carriage,
setting the container in a closed state in which any access to the compartments is prevented,
placing the container on a ground surface provided with an anchorage,
moving the container with the rack of the carriage in an extended position in which the rack is spaced apart from the base, setting the rack of the carriage in a retracted position in which the rack is close to the base, the locking system in the locked state, and the skirt masks at least a major portion of the base of the carriage,
enabling at least one user to pick up at least one of the articles, the container being set in the opened state, and
retrieving the container.

20. The method for delivering of claim 19, wherein prior to preparing the container, the articles are ordered by users, the method further comprising:
defining a location of the ground surface based on information related to the users, and
communicating the location and an access code to each user, the access code enabling the cabinet to be set in the opened state.

21. The method of claim 19 further comprising:
enabling at least one user to deposit at least one article in at least one compartment of the carriage, the container being set in the opened state, and
retrieving the container.

22. The method of claim 21, wherein prior to enabling the user to deposit the article, the article is requested to be picked up by the user, the method further comprises communicating a location of the ground surface and an access code to the user, the access code enabling the container to be set in the opened state.

* * * * *